US007386552B2

(12) United States Patent
Kitamura et al.

(10) Patent No.: US 7,386,552 B2
(45) Date of Patent: Jun. 10, 2008

(54) METHODS OF MIGRATING DATA BETWEEN STORAGE APPARATUSES

(75) Inventors: Manabu Kitamura, Yokohama (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 10/254,619

(22) Filed: Sep. 25, 2002

(65) Prior Publication Data

US 2003/0110237 A1 Jun. 12, 2003

(30) Foreign Application Priority Data

Dec. 6, 2001 (JP) ............................. 2001/372148

(51) Int. Cl.
*G06F 7/00* (2006.01)
*G06F 15/16* (2006.01)

(52) U.S. Cl. ...................... 707/10; 707/204; 707/205; 709/219

(58) Field of Classification Search .................. 707/10, 707/204–205, 200, 202, 104.1, 100–102; 709/217–219, 203, 223–230; 711/112, 114, 711/161; 710/74

See application file for complete search history.

(56) References Cited

U.S. PATENT DOCUMENTS

| 5,276,867 | A | * | 1/1994 | Kenley et al. ............... 707/204 |
| 5,367,698 | A | * | 11/1994 | Webber et al. .............. 709/203 |
| 5,475,834 | A | * | 12/1995 | Anglin et al. ............... 707/203 |
| 5,495,607 | A | * | 2/1996 | Pisello et al. ................. 707/10 |
| 5,564,037 | A | * | 10/1996 | Lam ........................... 707/204 |
| 5,678,044 | A | * | 10/1997 | Pastilha et al. ........... 707/104.1 |
| 5,680,640 | A | * | 10/1997 | Ofek et al. .................... 710/19 |
| 5,832,522 | A | * | 11/1998 | Blickenstaff et al. ........ 707/204 |
| 5,873,103 | A | * | 2/1999 | Trede et al. ................. 707/204 |
| 5,953,729 | A | * | 9/1999 | Cabrera et al. .............. 707/204 |
| 5,991,753 | A | * | 11/1999 | Wilde .......................... 707/204 |
| 6,108,748 | A | * | 8/2000 | Ofek et al. ................... 711/112 |
| 6,230,239 | B1 | * | 5/2001 | Sakaki et al. ............... 711/112 |

(Continued)

FOREIGN PATENT DOCUMENTS

JP 09-097201 4/1997

(Continued)

*Primary Examiner*—John Breene
*Assistant Examiner*—Anh Ly
(74) *Attorney, Agent, or Firm*—Hogan & Hartson LLP

(57) ABSTRACT

A data migration system is provided for migrating data between an existing file server apparatus and a new file server apparatus in a computer system that includes a plurality of host computers and a plurality of file server apparatuses that are mutually connected to one another. The data migration system on the new file server apparatus copies file attributes unique to the network attached storage (NFS) and file attributes unique to the common internet file system (CIFS) from the existing file server apparatus, and stores the file attributes without changing the file attributes in the new file server apparatus. Then actual data is moved from the existing file server to the new file server. When a file access to data is made from a host computer during the file migration process, and if the data has not been migrated from the existing file server to the new file server, the data is read out from the existing file server onto the new file server, and the file access is processed by the new file server as if the existing file server were processing the file access.

30 Claims, 11 Drawing Sheets

U.S. PATENT DOCUMENTS

| | | | |
|---|---|---|---|
| 6,269,382 B1* | 7/2001 | Cabrera et al. | 707/204 |
| 6,304,942 B1* | 10/2001 | DeKoning | 711/114 |
| 6,324,630 B1* | 11/2001 | Onodera | 711/165 |
| 6,502,205 B1* | 12/2002 | Yanai et al. | 714/7 |
| 6,640,278 B1* | 10/2003 | Nolan et al. | 707/10 |
| 6,654,830 B1* | 11/2003 | Taylor et al. | 709/203 |
| 6,782,389 B1* | 8/2004 | Chrin et al. | 707/10 |
| 6,804,719 B1* | 10/2004 | Cabrera et al. | 707/10 |
| 6,823,336 B1* | 11/2004 | Srinivasan et al. | 707/8 |
| 6,850,959 B1* | 2/2005 | Golds | 707/205 |
| 6,889,249 B2* | 5/2005 | Miloushev et al. | 707/10 |
| 6,938,039 B1* | 8/2005 | Bober et al. | 707/8 |
| 6,944,785 B2* | 9/2005 | Gadir et al. | 714/4 |
| 6,976,060 B2* | 12/2005 | Manczak et al. | 709/219 |
| 7,120,673 B2* | 10/2006 | Kitamura et al. | 709/213 |
| 7,146,377 B2* | 12/2006 | Nowicki et al. | 707/102 |
| 2001/0001870 A1* | 5/2001 | Ofek et al. | 707/200 |
| 2002/0004890 A1* | 1/2002 | Ofek et al. | 711/161 |
| 2002/0129277 A1* | 9/2002 | Caccavale | 713/201 |
| 2002/0161855 A1* | 10/2002 | Manczak et al. | 709/219 |
| 2003/0037019 A1* | 2/2003 | Nakamura | 707/1 |
| 2003/0069903 A1* | 4/2003 | Gupta et al. | 707/204 |
| 2003/0074463 A1* | 4/2003 | Swartz et al. | 709/230 |
| 2003/0195895 A1* | 10/2003 | Nowicki et al. | 707/100 |
| 2004/0107315 A1* | 6/2004 | Watanabe et al. | 711/114 |
| 2004/0133608 A1* | 7/2004 | Saake et al. | 707/200 |
| 2004/0139097 A1* | 7/2004 | Farber et al. | 707/100 |
| 2004/0153642 A1* | 8/2004 | Plotkin et al. | 713/150 |
| 2004/0167942 A1* | 8/2004 | Oshinsky et al. | 707/204 |
| 2004/0236798 A1* | 11/2004 | Srinivasan et al. | 707/200 |
| 2005/0027735 A1* | 2/2005 | Cabrera et al. | 707/102 |
| 2006/0080353 A1* | 4/2006 | Miloushev et al. | 707/102 |

FOREIGN PATENT DOCUMENTS

| | | |
|---|---|---|
| JP | 2000-187608 | 7/2000 |
| JP | 2000-285024 | 10/2000 |

* cited by examiner

METHODS OF MIGRATING DATA BETWEEN STORAGE APPARATUSES

FIELD OF THE INVENTION

The present invention relates to data access methods to be implemented in storage apparatus systems in information processing systems, and in particular, to methods of migrating data between storage apparatuses.

DESCRIPTION OF RELATED ART

Computer systems used in banks and corporations require large-scale storage apparatus as voluminous amounts of data are handled. Moreover, as these data are increased on a daily basis it becomes necessary to expand the storage apparatus or replace them with larger capacity systems. The normal means to replace a storage apparatus is by using magnetic tapes, etc. to back up the system (existing storage apparatus) and restoring the data into the new storage apparatus (new storage apparatus.)

However, in order to perform the back up it is necessary to temporarily suspend the operation of the I/O devices of the host computers. And, the suspension period is generally long. This stoppage time increases as the storage capacity increases. Also, in this type of a large-scale system the norm is to operate the system 24 hours a day without stopping. And, since replacing the storage apparatus also requires 24 hour operation, it would pose a problem to perform the back up by suspending I/O devices on the host computers side.

A method for providing on-line data migration from an existing storage apparatus to a replacement storage apparatus has been proposed. When deploying a new storage apparatus in a system that has been initially operated by the host computer and storage apparatus (existing storage apparatus), the new storage apparatus simultaneously receives read-write accesses from the host computer while migrating the data from the existing storage apparatus to the new storage apparatus. More specifically, when migrating data from the existing to the new storage apparatus, the connection between the host computer and the existing storage apparatus is temporarily cut off, and the host computer is connected to the new storage apparatus. The new storage apparatus is also connected directly to the existing storage apparatus. The new storage apparatus makes it possible to migrate data between the storage apparatuses in a manner transparent to the user as the new storage apparatus is provided with a function to copy data of the existing storage apparatus to the new storage apparatus and a function to make itself look like the existing storage apparatus to the host computer.

In recent years, there has been a proliferation of storage apparatuses called Network Attached Storages (NASs), which are directly connected to a local area network (LAN) that mutually connects to several host computers. A NAS and the respective host computers exchange data with a network file access protocol such as Network File System (NFS). The NFS has stipulated commands necessary for file accesses such as those for reading/writing files and creating/deleting files. Because of this, by combining these commands, it is possible to copy data from one NAS (existing NAS) to a new NAS.

Simple data copying is fully possible even in NAS by using the method described above. However, when data is migrated from a NAS, attribute information attached to the data may pose a problem. File names, file owners, the creation date of files and the access times are written in files. When copying files from the existing NAS to the new NAS, the mere operation of simply reading out the files from the existing NAS and copying the files to the new NAS would alter the file creation dates and the time they were accessed. Thus, it is not possible to migrate data while retaining the state of the existing NAS. Moreover, for accesses between a NAS and a host computer, it is possible to made data accesses with several types of access protocol.

For example, many NASs support NFS and Common Internet File System (CIFS). The file attributes of the respective protocols have items that are shared as well as those that are not. Because of this, if files are read from an existing NAS with an NFS protocol, only the file attributes according to NFS can be extracted, but the migration of file attributes in CIFS protocol is not possible.

SUMMARY OF THE INVENTION

The present invention provides NASs with a system that is capable of migrating complete data in a manner transparent to the host computers and users.

A computer system in accordance with an embodiment of the present invention includes a host computer, a first file server apparatus and a second file sever apparatus. While the host computer, that is connected to the first file server apparatus, initially performs input and output operations, the connection between the host computer and the first file server apparatus is temporarily severed when data is migrated from the first file server apparatus to the second server apparatus. Then, the host computer is connected to the second file server apparatus, and the first file server apparatus is connected to the second file server apparatus.

Migration of data from the first file server apparatus to the second file server apparatus is performed in the following manner. First, the second file server apparatus first reads out a directory tree structure of the first file server apparatus, and read out all of the files in the first file server apparatus by using the directory tree structure. The files thus read are successively written into the second file server apparatus.

In one embodiment, the date migration is realized by the second file server apparatus reading out files and file attributes from the first file server apparatus, and writing the results into the second file server apparatus. As the second file server apparatus writes the file attributes, date information written in the first file server apparatus are stored in the second file server apparatus without being changed.

When the first and second file server apparatuses support a plurality of file access protocols, the second file server apparatus performs reading and writing operations for file attributes of one file in a plurality of times. For example, when two types of access protocols are supported, the read and write operations of file attributes are performed twice.

Also, when there are file accesses from the host computer during data migration, the second file server apparatus processes the file accesses. For example, when the host computer makes a file read access to read a file on the first file server apparatus when the file has not been migrated to the second file server apparatus, the file is first migrated from the first server apparatus to the second file server apparatus, and then the second server apparatus accepts the read access from the host computer. If the migration of a file has been completed when the host computer makes a read access to the file, the second file server apparatus will directly process the read request from the hosts.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 1:
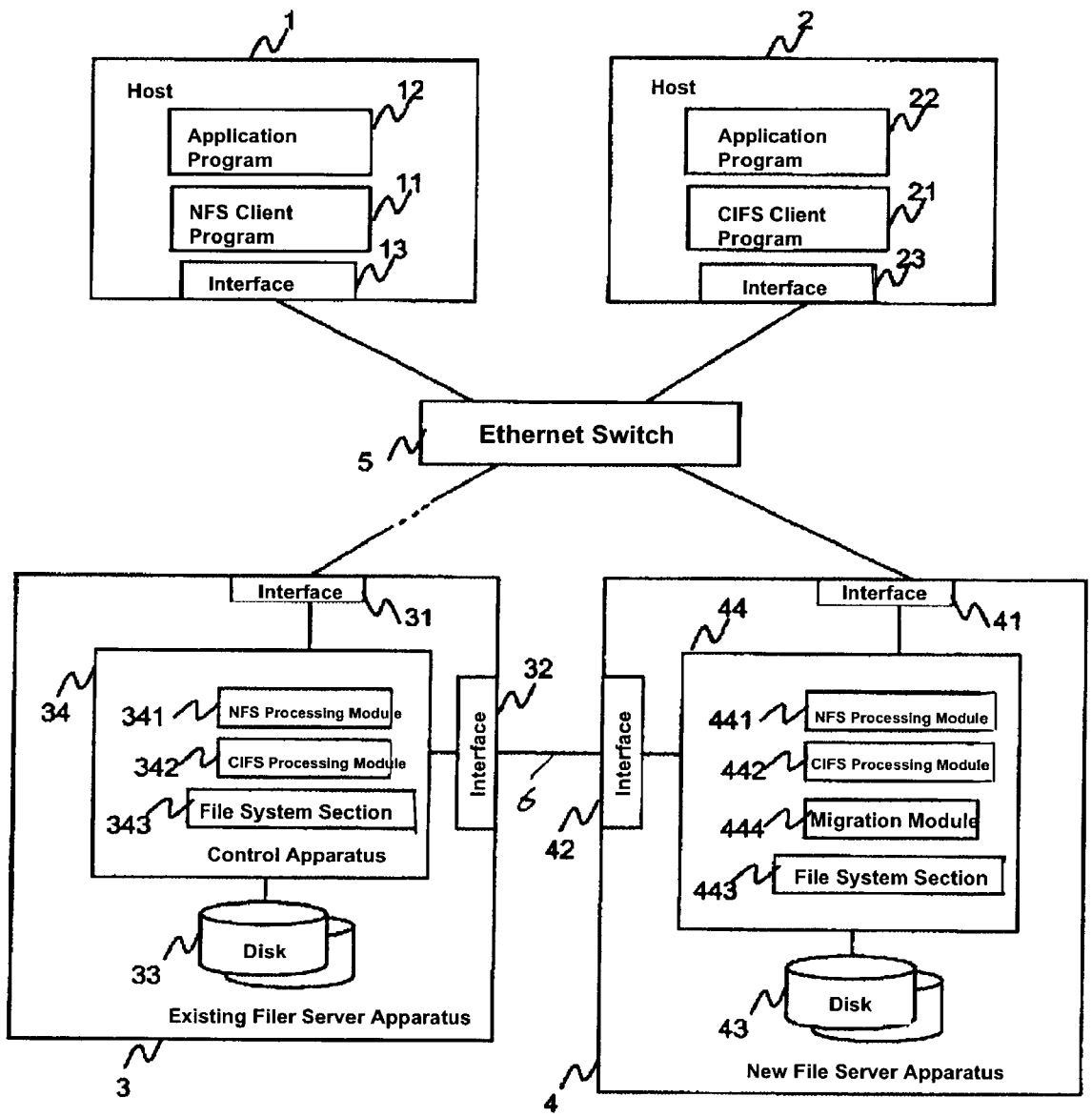
FIG. 1 is a block diagram of an example configuration of a computer system in accordance with one embodiment of the present invention.

FIG. 1 is a block diagram of an example configuration of a computer system in accordance with an embodiment of the present invention. The computer system includes hosts (e.g., a host 1, a host 2, and the like), an existing file server apparatus 3, a new file server apparatus 4 and an Ethernet switch 5.

The host 1 has a Network File System (NFS) client program 11 and an application program 12. The application program 12 accesses the existing file server apparatus 3 or the new file server apparatus 4 via the NFS client program 11. Also, the host 2 has a Common Internet File System (CIFS) client program 21 and an application program 22, the application program 22 accesses the existing file server apparatus 3 or the new file server apparatus 4 via the CIFS client program 21.

The existing file server apparatus 3 consists of interfaces 31, 32, a storage device (e.g., a storage disk) 33 and a controller apparatus 34. The new file server apparatus 4 consists of interfaces 41, 42, a storage device (e.g., a storage disk) 43 and a controller apparatus 44. The existing file server apparatus 3 is connected to the hosts 1 and 2 from its interface 31 via the Ethernet switch 5, while the new file server apparatus 4 is connected to the two hosts from its interface 41 via the Ethernet Switch 5. Also, the existing file server apparatus 3 and the new file server apparatus 4 are mutually connected to their interfaces 42 and 32, respectively, via an Ethernet cable 6.

The controller apparatus 34 has an NFS processing module 341 and a CIFS processing module 342 and a file system section 343. It is noted that, in the present embodiment, each module is a functional unit of the program that is read into and executed by the controller apparatus 34. The NFS processing module 341 processes the file access request from the host 1, while the CIFS processing module 342 processes the file access request from the host 2. The file system section 343 performs read and write processes for files within the disk 33. When the NFS processing module 341 or the CIFS processing module 342 receives a file read request, the file system section 343 takes over the request and extracts files to be read and file attribute information of the files from the disk 33 and delivers them to the NFS processing module 341 or the CIFS processing module 342. When a write request is received, the files received by the NFS processing module 341 or the CIFS processing module 342 are written into the disk 33.

Similarly, the controller apparatus 44 has a NFS processing module 441, a CIFS processing module 442 and a file system section 443. These generally perform the same operations as the NFS processing module 341, the CIFS processing module 342 and the file system section 343. Also, the controller apparatus 44 has a migration module 444 that performs migration of data from the existing file server apparatus 3 to the new file server apparatus 4.

Figure 2:
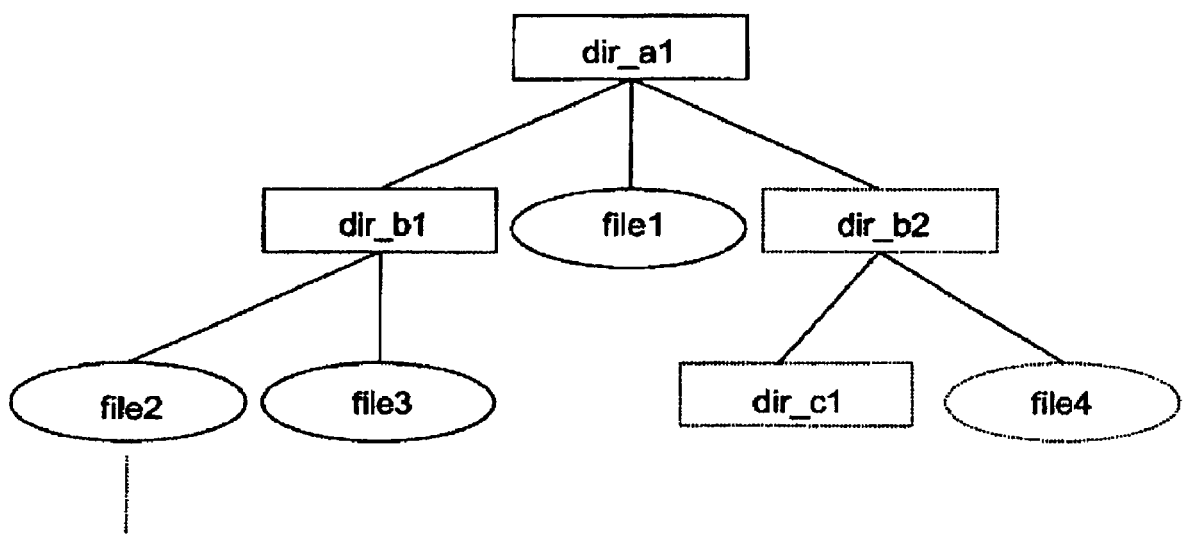
FIG. 2 shows a file/directory structure of the present invention stored in an existing file server apparatus and a new file server apparatus.

The terminology and the outline of the file system handled by the new file server apparatus 4 in the embodiment of the present invention shall be explained with reference to FIG. 2. When managing files with a general purpose file server apparatus, a structure called hierarchical directory is used. As shown in FIG. 2, with a root directory being at the top, several files/directories hierarchically exist under the root directory. Hereafter, the collection of files/directories that belong to the hierarchical file/directory structure under a single root directory as shown in FIG. 2 and attribute information forming the structure shall be called a file system.

The existing file server apparatus 3 and the new file server apparatus 4 can control at least one of these file systems. A file system does not necessarily exist in a single disk, but may be distributed across a plurality of disks. Conversely, a plurality of file systems may be stored in a single disk. However, for the sake of simplifying the explanation of embodiments of the present invention, descriptions shall be made as to an example in which one file system is stored in one disk.

Figure 3:
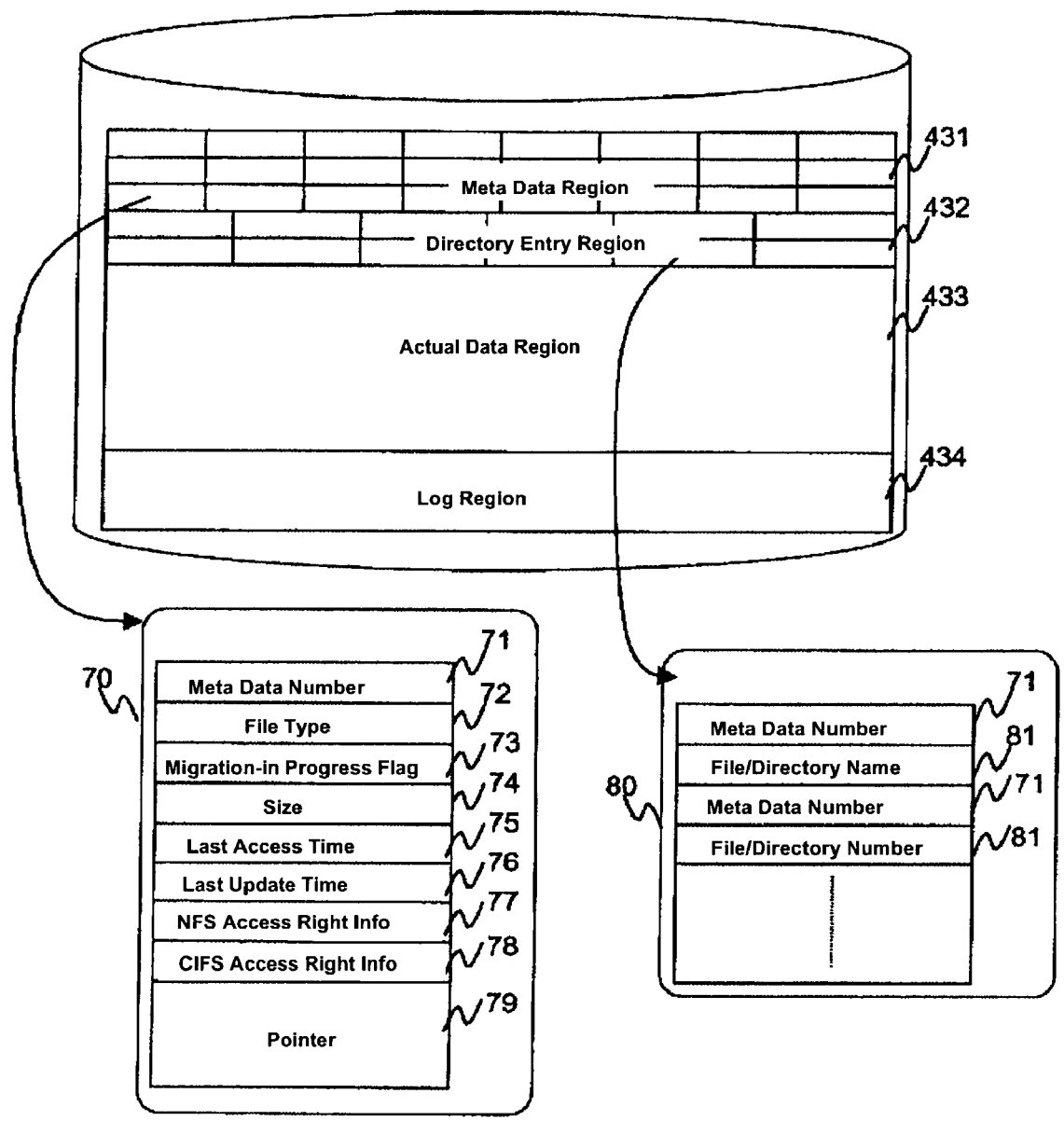
FIG. 3 shows a structure of a meta data structure of a file system of the present invention stored in a disk of a new file server apparatus

FIG. 3 shows the structure of a file system placed on a disk 43 of the new file server apparatus 4. The file system consists of meta data, which is attribute information that indicates the size of the respective files or the like, directory entry, which is a collection of file/directory names in the directory and actual data which is the substance of the file. In the embodiment of this invention, a meta data region 431 that stores meta data, a directory entry region 432 which stores directory entry and an actual data region 433 that stores actual data exist on the disk 43. In addition, the disk 43 incorporates a log region 434, which is used by the migration module 444. In the embodiment of this invention, it is noted that the meta data region 431 and the log region 434 are on the disk 43. But this is not mandatory. These regions may also exist on a memory device of the new file server apparatus 4.

The meta data region 431 stores meta data 70 in the number equal to the number of files/directories. Each meta data 70 consists of a meta data number 71, file type 72, migration-in-progress flag 73, size 74, last access time 75, last update time 76, NFS access right information 77, CIFS access right information 78, and pointers 79. Especially, the access right information for NFS 77 is a file attribute information for accessing files with the NFS protocol, and the CIFS access right information 78 is a file attribute information to access files with the CIFS protocol. Also, the directory entry region 432 has directory entries 80 in the same number of directories. The directory entry 80 controls at least one of the followings, a list of file names in a directory or directory names.

The meta data number 71 is a unique number within the file system. A file or a directory indicated by the meta data number 71 is uniquely determined within the file system. Files or directories that belong to the lower ranks of the directory indicated by the meta data number 71 are stored in other directory entries 80 that correspond to the meta data number 71, making it possible to grasp the hierarchical structure of files or directories by tracing these information.

The file type 72 incorporates a flag showing, for example, whether the object indicated by the meta data number 71 is a file or directory. The migration-in-progress flag 73 is used by the migration module 444. When a file is in the process of migration, this flag is turned on and when the file migration is completed, the flag is turned off. The specific usage of this flag by the migration module 444 will be explained later. The size 74 shows the size of the file. The last access time 75 shows the latest time when the host 1 or 2 reads or writes the file. The last update time 76 shows the latest time for updating or writing of the file. The pointer 79 contains physical address information about the actual file or directory stored on the disk 43. If the object indicated by the meta data 70 is a file, the pointer 79 shows an area of the actual data region 433. In the case of a directory, it shows a block on the directory entry region 432. There are a plurality of pointers 79 if the file size is large and the file is placed in fragments in more than one region.

The NFS access right information 77 is information necessary when the host 1 or 2 refers to a file via the NFS processing module 441, and the CIFS access right information 78 is information necessary when the host 1 or 2 refers to a file via the CIFS processing module 442. The NFS and CIFS are managed so that they are able to provide respectively different stipulated information. For example, attribute information includes permission information for restricting the users with access to the files. However, the permission information provided by the NFS processing modules 341 and 441 have three types of permission information that indicate whether or not the owner of the files could access the files (read, write and execute), whether the group to which the files belong could access the files and whether or not other users could access the files.

On the other hand, the information provided by the CIFS processing modules 342 and 442 are called Access Control List (ACL), whereby permission information for multiple users can be set for a file. For example, different permission information by individual users can be set such that, for example, User A is permitted just to read the file while User B is permitted to also write into the file. Thus, the NFS processing module 441 and the CIFS processing module 442 handle different types of attribute information. Accordingly, the file system for the new file service 4 retains two types of information so that files can be accessed from either of the two processing modules.

The directory entry 80 retains a list of names of files/directories that come immediately below one directory. The directory entry 80 contains pairs of meta data number 71 and file/directory name 81 for all of the files and directories under that directory.

While the information, including the meta data 70 that comprise the file system explained with reference to FIG. 3 is on the file server apparatus 4, the existing file server apparatus 3 also has similar information. However, the types of information such as those for meta data 70 and the data structure need not be the same for the new file server apparatus 4 and the existing file server apparatus 3. Also, the embodiment of the present invention is described on the premise that the existing file server apparatus 3 and the new file server apparatus 4 are accessible from either the host 1 or the host 2. However, if there are other devices that allow file access through Novell Netware file access protocol, the meta data will independently possess attribute information unique to that file access protocol.

Next, an outline of the data migration process for migrating data from the existing file server apparatus 3 to the new file server apparatus 4 will be explained. When the host 1 or 2, or the new file server apparatus 4 makes an access to files in the existing file server apparatus 3, the only means to access the files is through the NFS processing module 341 or the CIFS processing module 342. On the other hand, even when the host 1 or the host 2 is to access the new file server apparatus 4, the only means to do this is through the NFS processing module 341 or the CIFS processing module 342.

Because of this, if the host 1 or the host 2 simply reads files from the existing file server apparatus 3 and writes the files in the new file server apparatus 4, the files are read out via the NFS processing module 341 or the CIFS processing module 342, and the files are written in via the NFS processing module 441 or the CIFS processing module 442.

In this case, because the files are read via the NFS processing module 341 or the CIFS processing module 342, problems occur. For example if the access is made via the NFS processing module 341, file attributes and access right information unique to CIFS may be lacking. Conversely, if the access is made via the CIFS processing module 342, the file attributes unique to NFS may be lacking.

Also, when the host 1 or the host 2 writes files into the new file server apparatus 4 via the NFS processing module 441 or CIFS processing module 442, a problem occurs in that the last update time 76 or the last access time 75 that remains in the file attribute information of the existing file server apparatus 3 will be changed to the time when the files are written in the new file server apparatus 4 by the host 1 or the host 2. The migration module 444 in accordance with the embodiment of the present invention solves these problems.

Prior to the data migration, the hosts 1 and 2 are connected only to the existing file server apparatus 3 via the Ethernet switch 5 and performing input/output processing. When migrating data, first, the hosts 1 and 2 are disconnected from the existing file server apparatus 3. More specifically, when the hosts 1 and 2 are using the file system of the existing file system 3, the file system is unmounted. Then, the interface 31 of the existing file server apparatus 32 is disconnected from the Ethernet switch 5, while the interface 32 of the existing file server apparatus 32 and the interface 42 of the new file server apparatus are connected. With this, the existing file server apparatus 3 is separated from the network, so that accesses to the existing file server apparatus 3 can be made only from the new file server apparatus 4.

As the new file server apparatus 4 is newly connected to the network, the settings for the IP address of the file server apparatus 4, shared directory names (directory names to be referred when the file system is shown to the hosts 1 and 2), and the like are altered to the settings of the existing file server apparatus 3. Also, the existing file server apparatus 3 may not need to be physically disconnected from the network as in the case of the embodiment of this invention, but the hosts 1 and 2 must be arranged so that they cannot access the existing file server apparatus 3. For example, this can be done by changing the IP address of the existing file server apparatus 3.

Subsequently, the file system of the new file server apparatus 4 is mounted on the hosts 1 and 2 which resume I/O processing. The migration module 444 sequentially writes onto the disk 32 of the new file server apparatus 4 the files from the existing file server apparatus 3, while at the same time accepting the read-write processing requests from the hosts 1 and 2. Even when the host 1 or 2 performs the I/O processing with respect to the new file server apparatus 4 during the migration of data, the host can freely read and write files into the new file server apparatus 4 as the migration module 444 will make it appear as if the files of the existing file server apparatus 3 exist in the new file server apparatus 4.

Next, referring to FIG. 4, the flow of file migration processes performed by the migration module 444 to migrate files from the existing file server apparatus 3 to the new file server apparatus 4 will be described. The migration module 444 sequentially copies all of the attribute information of the files/directories starting from the root directory of the existing file server apparatus 3 (Step 1001), and then copies the actual data of the respective files (Step 1002). In the event the host 1 or 2 tries to make a file update while the files and attribute information are being migrated, the operation of the file update is recorded in the log region 434, and at the end of the migration process, the content recorded in the log region 434 is reflected on the files, and the migration process is terminated (Step 1003).

The reason for migrating only the file/directory attribute information in its entirety is because there are generally more accesses to the file/directory attribute information than to the actual data when the host 1 or the host 2 access the files/directories. When the host 1 and/or the host 2 makes an access to a file/directory, and when the related files have not been migrated from the existing file server apparatus 3, the migration module 444 will try to read the files from the existing file server apparatus 3. As a result, the response time deteriorates as viewed from the hosts 1 and 2 if the above procedure is followed. The embodiment of present invention employs the method of initially migrating all file/directory attribute information. However, if the performance is not of importance, there would be no problem if the file/directory attribute information and the actual data are simultaneously migrated.

Figure 4:
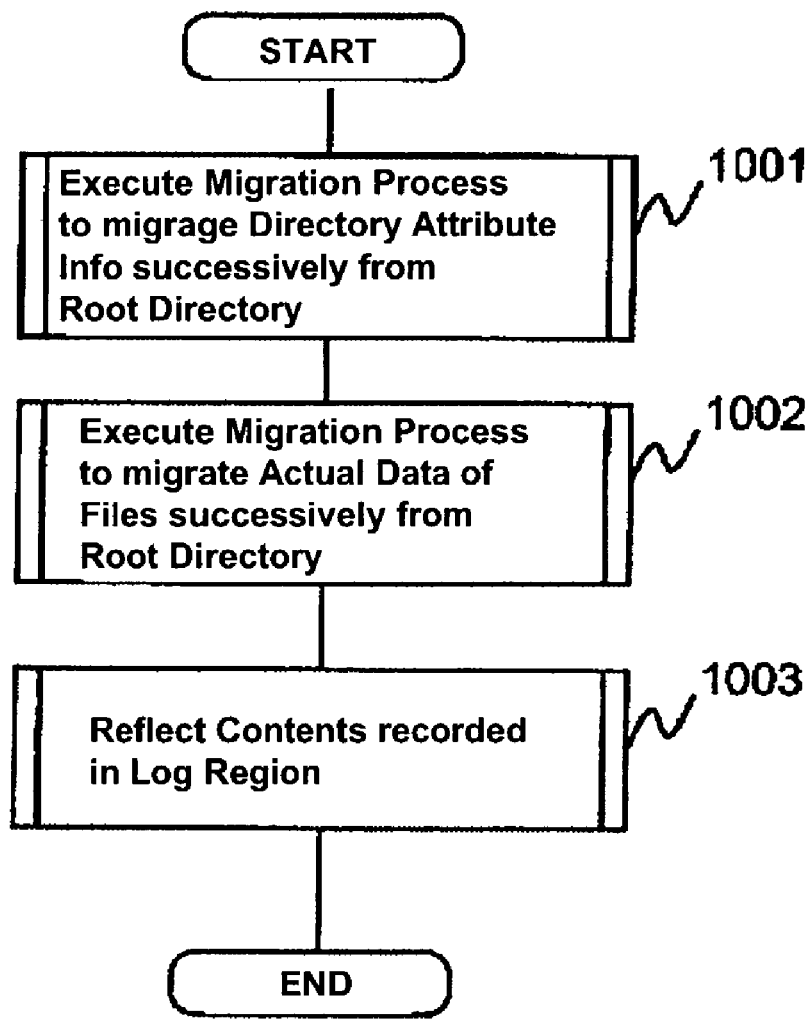
FIG. 4 shows a flowchart of a data migration process for migrating data performed by a migration module in accordance with an embodiment of the present invention.
Figure 5:
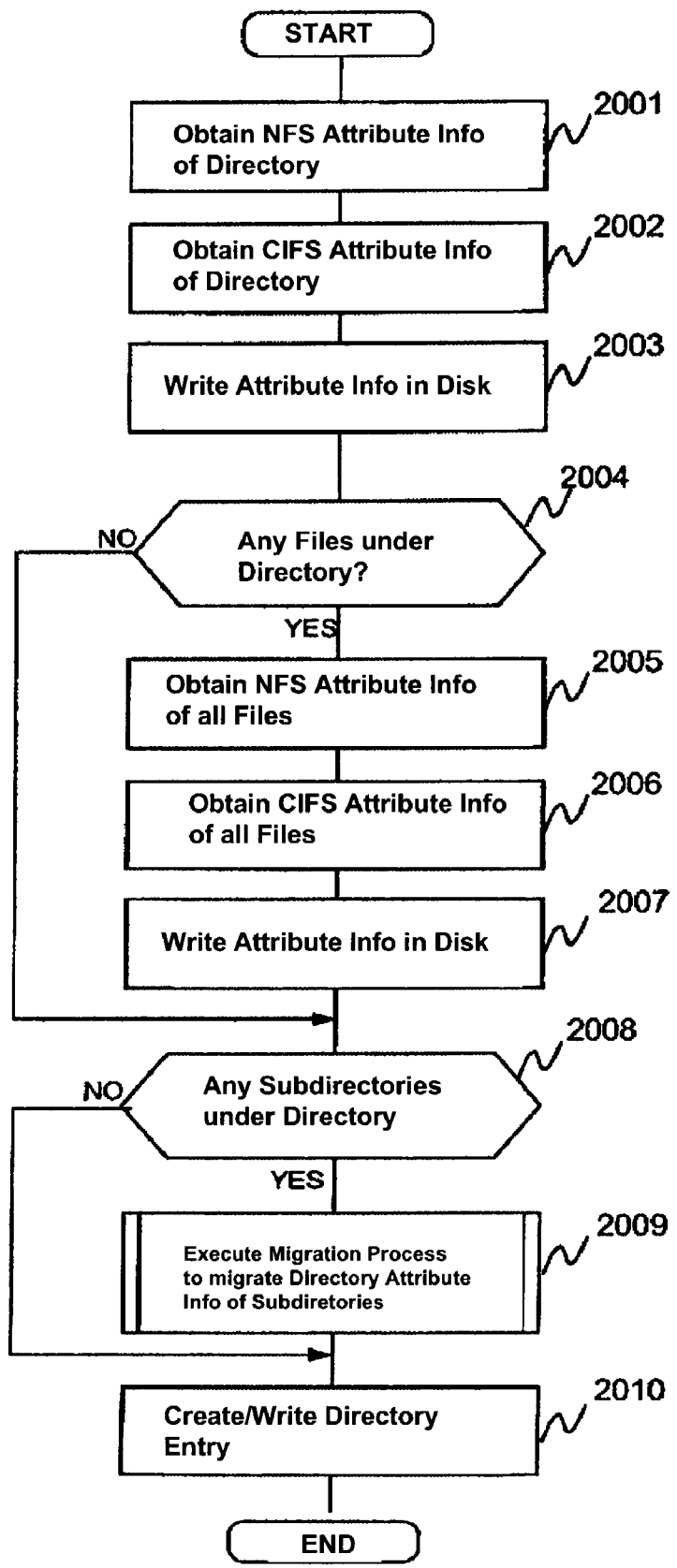
FIG. 5 shows a flowchart of a migration process for migrating file/directory attribute information which is performed by the migration module.

The migration process for migrating the file/directory attributes that corresponds to Step 1001 in FIG. 4 and the migration process for migrating actual data corresponding to Step 1002 in FIG. 4 shall be explained sequentially with reference to FIG. 5. First, the flow of migration process for migrating the attribute information of the files/directories performed by the migration module 444 will be described with reference to FIG. 5. The migration module 444 sequentially executes processes in FIG. 5 starting from the root directory of the existing file server apparatus 3.

First, with NFS command, the attribute information of the directory is obtained (Step 2001). For example, in the case of the NFS, the attribute information can be acquired with GETATTR command. Next, the attribute information of the directory is obtained with CIFS command (Step 2002). In this case, for example, SMBgetattr may be used. In the embodiment of the present invention, the size 74 of meta data 70, the last access time 75 and the last update time 76 are simultaneously acquired when the NFS access right information 77 is acquired in Step 2001. The sequence of Steps 2001 and 2002 may be reversed.

In Step 2003, the attribute information acquired is written in the meta data region 431 of the disk. In this instance, the migration-in-progress flag 73 in the meta data 70 is turned on. Next, a search is made to verify whether files exist under the directory (Step 2004). A verification can be made, for example, by executing NFS command READDIR, etc. against the existing file server apparatus 3. If any files exist, the process proceeds to Step 2005.

In Step 2005, the NFS attribute information is acquired for all files under the directory, upon receiving the search result obtained in Step 2004. In the following Step 2006, the CIFS attribute information is acquired on all files under the directory by CIFS command. In Step 2007, the attribute information acquired in Steps 2005 and 2006 are written into the meta data region 431. In this case too, the migration-in-progress flag 73 of meta data 70 is turned on as in the case of Step 2003.

In Step 2008, a search is made to check whether any directory (subdirectory) exists under the directory. If subdirectories exist, the migration process for migrating attribute information of files and directories as shown in FIG. 5 is executed for the entire subdirectories (Step 2009). In other words, the process of FIG. 5 will be executed recursively such that the attribute information of files and directories in one file system will be migrated in their entirety by executing the process from the root directory. Finally, the process completes when information on names of the files and directories under the directory obtained through Steps 2004 and 2008 is created and written in as a directory entry 80 (Step 2010).

Figure 6:
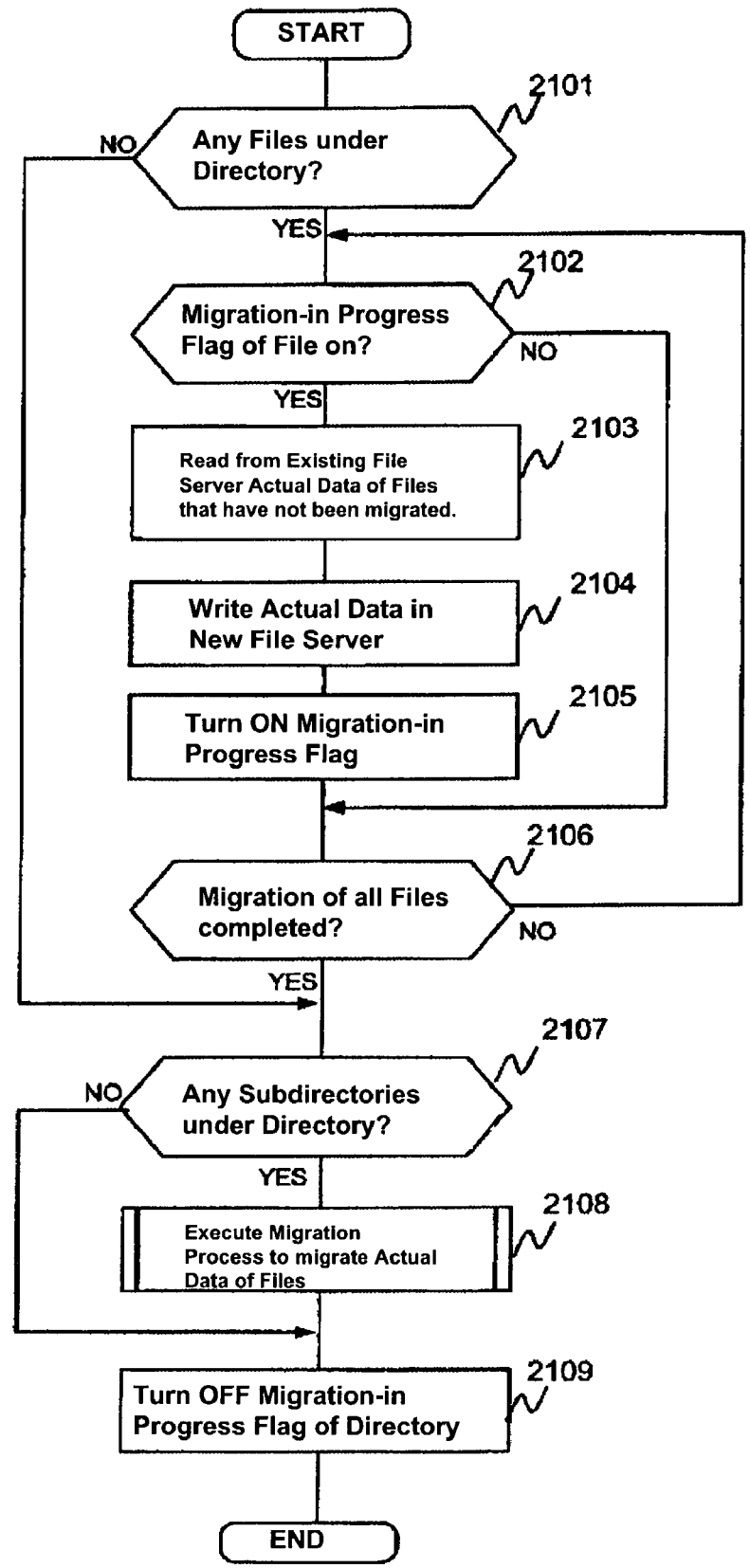
FIG. 6 shows a flowchart of a file data migration process for migrating actual files, which is performed by the migration module.

Next, the migration process for migrating actual file data is explained referring to FIG. 6. As in the case of the migration process for migrating file attribute information in FIG. 5, the migration process starts from the root directory, and the migration of actual file data for the entire file system is performed by recursively executing the process for the sub directories. First, a verification is made as to whether any files exist under the directory targeted for migration (Step 2101). This process is realized as the migration module 444 searches for the directory entry in the file system.

Next, as for files under the directory, a verification is made (Step 2102) as to whether the migration-in-progress flags are on. For files whose migration-in-progress flags are on, the actual file data are read from the existing file server apparatus 3 (Step 2103), and the actual file data are written in the new file server apparatus 4 (Step 2104). In Step 2105, for files whose data have been written in the new file server apparatus 4, their migration-in-progress flags will be turned off. In Step 2106, a verification is made as to whether the migration of all files under the directory targeted for migration has been completed. If completed, the process moves to Step 2107. If there are files that have not been migrated, the processes from Step 2102 to Step 2105 are repeated.

In Step 2107, a verification is made as to whether there are subdirectories under the directory. If any subdirectories exist, the migration of actual file data in FIG. 6 is executed for the subdirectories (Step 2108). In other words, as in the case of Step 2009 in FIG. 5, the migration of actual file data as indicated in FIG. 6 is executed from the root directory, and also is executed for the subdirectories recursively. Thereafter, the migration-in-progress flag 73 of the directory is turned off (Step 2109), to complete the process. If there is no subdirectory found in Step 2107, the process proceeds directly to Step 2109 to end the process after turning off the migration-in-progress flag.

Figure 7:
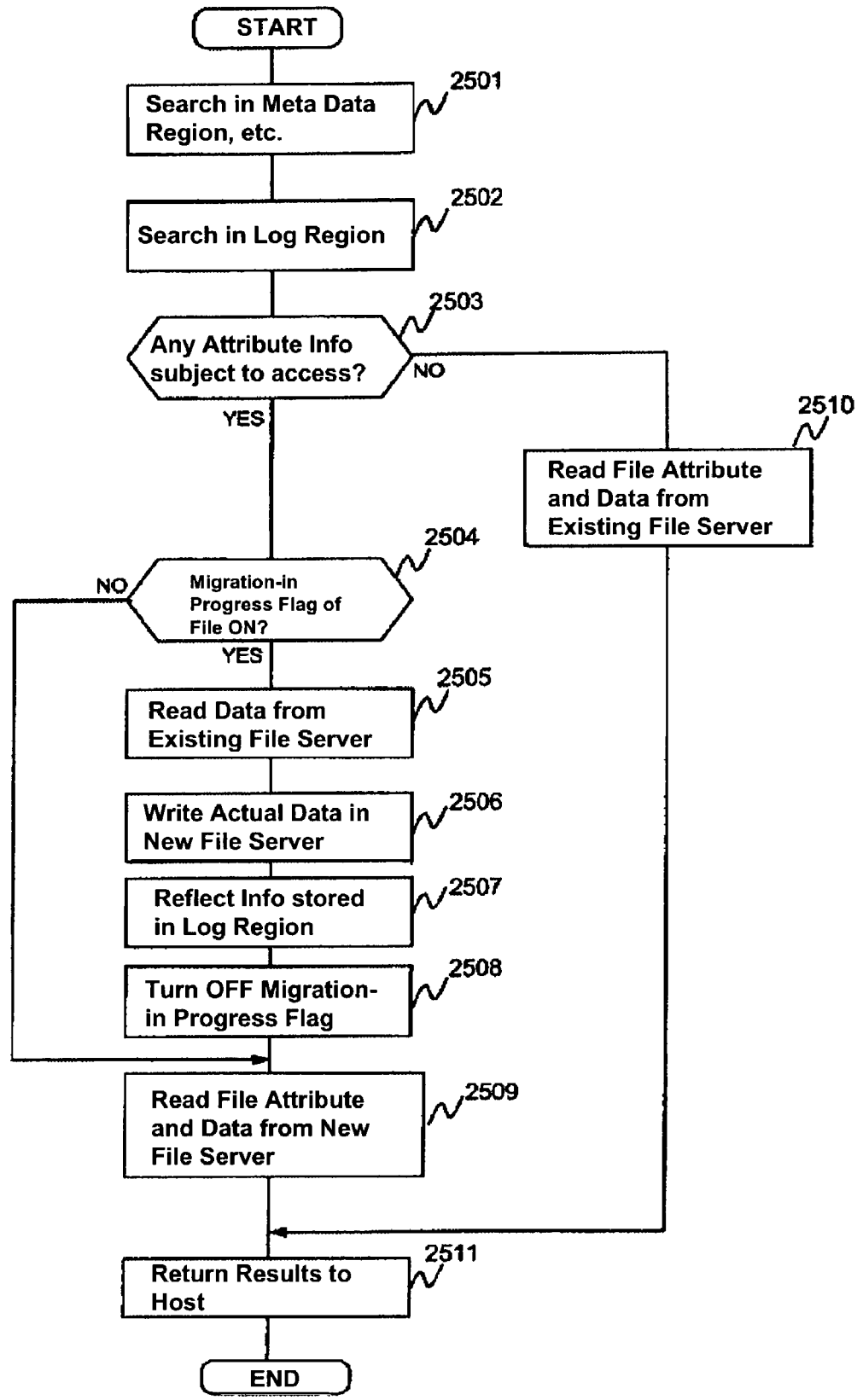
FIG. 7 shows a flowchart of processes performed by the migration module, which are performed when a host computer issues a file read request while the migration module is processing.

Next, a description is made as to the flow of process performed by the migration module 444 when a file access is made from the host 1 or the host 2 during the migration process of FIGS. 5 and 6. First, referring to FIG. 7, a description is made as to the flow of process when a read request to read files or file attributes is issued from the host 1 or the host 2 during the migration process. When a file access is made from the host 1 or the host 2, the NFS processing module 441 or the CIFS processing module 442 of the new file server apparatus 4 processes the file access by using the file system section 443. But during a migration process, the file access is processed via the migration module 444.

When the migration module 444 receives a file access request from the NFS processing module 441 or the CIFS processing module 442, the migration module 444 first conducts a search in the meta data region 431 and the directory entry region 432 within the disk 43 of the new file server apparatus 4 (Step 2501), and a search in the log region 434 to determine whether the file attribute information being accessed has been migrated to the new file server apparatus 4 (Step 2502). The migration module 444 records in the log region 434 the contents when the host 1 or the host 2 requests to create or update files during the migration process. This process is explained later.

From the results of Steps 2501 and 2502, a determination is made as to whether the attribute information of the file targeted for access has been migrated to the new file server apparatus 4 (Step 2503). If the attribute information has not been migrated, Step 2510 is performed, and the migration module 444 reads the file attributes and data from the existing file server apparatus 3 (Step 2510), and terminates the process after the results are returned to the host 1 or the host 2 (Step 2511).

When the attribute information has been migrated to the new file server apparatus 4, the process moves to Step 2504 to check whether or not the migration-in-progress flag 73 of the file's meta data 70 is on. If the flag is on, the actual data has not been migrated to the new file server apparatus 4, and thus the actual data is read from the existing file server apparatus 3 (Step 2505) and the data read out will be written into the new file server apparatus 4 (Step 2506). Moreover, when there is information pertaining to operations such as update of the file in the log region 434, this information is reflected in the disk 43 of the new file server apparatus 4 (Step 2507), and the migration-in-progress flag 73 is turned off (Step 2508) such that the migration of the actual file data is performed.

Next, the read process is completed upon directly reading the file attributes and data from the disk 43 of the new file server apparatus 4 (Step 2509), and returning the results to the host 1 or the host 2 (Step 2511). Also if the flag is off at Step 2504, this indicates that the file attributes and actual data have been migrated to the new file server apparatus 4, and thus Step 2509 is executed to return the results to the host 1 or the host 2 (Step 2511), to complete the read process during the migration.

Figure 8:
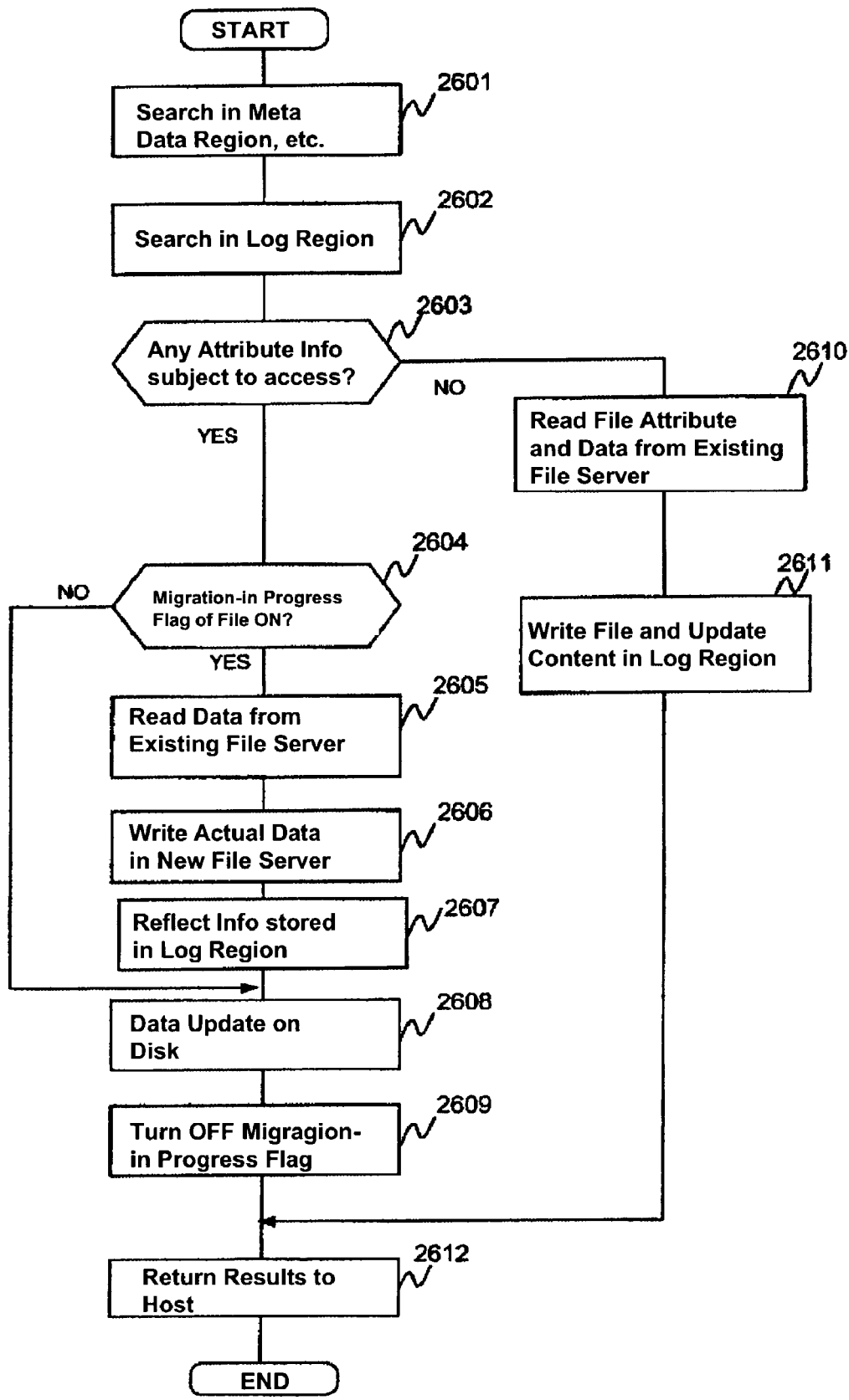
FIG. 8 shows a flowchart of processes performed by the migration module, which are performed when a host computer issues a file write request while the migration module is processing.

Next, referring to FIG. 8, a description is made as to the flow of process performed by the migration module 444 when there is a request from the host 1 or the host 2 to update or delete files during the migration process.

When a file access request is received from the NFS processing module 441 or the CIFS processing module 442, a search is conducted in the meta data region 431 and the directory entry region 432 (Step 2601), and a search is conducted in the log region 434 (Step 2602) to see whether or not the attribute information for the files to be accessed have been migrated to the new file server apparatus 4. A determination is made (Step 2603) as to whether the attribute information of the files to be accessed has been migrated to the new file server apparatus 4. If the attribute information has not been migrated, the process proceeds to Step 2610, and the migration module 444 reads the file attributes and data from the existing file server apparatus 3.

Next, in Step 2611, the file attributes and actual data read from the existing file server apparatus 3 and the update contents received from the NFS processing module 441 or the CIFS processing module 442 are written into the log region 434. The reason why the files and update contents are written in the log region instead of immediately reflecting them in the meta data region 431 is because there may be cases in which the update contents cannot be immediately reflected.

For example, when data having the directory structure shown in FIG. 3 is recorded in the existing file server apparatus 3, and the migration of attribute information for files and directories under dir_b1 has been completed during the migration of the file system to the new file server apparatus 4, there is a possibility of a state in which the attribute information of files and directories under dir_b2 (which corresponds to portions shown in FIG. 2 in dotted lines, where the oval sections indicate files and the rectangle sections indicates directories) may not have been migrated. In this case, for example, if there is a file update request for file4, the meta data for file4 cannot be stored because there is no attribute information of dir_b2, which is a directory to which file4 belongs, in the meta data region 431 and the directory entry region 432 of the new file server apparatus 4. But even in this situation, it is necessary to receive the update request from the host 1 or the host 2 and to reflect update contents in the new file server apparatus 4. The update contents are therefore recorded temporarily in the log region 434, and the contents in the log region 434 will be reflected later in the meta data region 431, etc. of the new file server apparatus 4.

The process proceeds to Step 2604 if the attribute information of the files targeted for access in Step 2603 has been migrated to the new file server apparatus 4, and the process checks if the migration-in-progress flags 73 of the meta data 70 of the files are on. If the flags are on, which means that the actual data has not been migrated to the new file server apparatus 4, the actual data is read from the existing file server apparatus 3 (Step 2605), and the actual data is written in the new file server apparatus 4 (Step 2606).

Moreover, if update information, etc. for the files exists in the log region 434, this information is reflected in the disk 43 of the new file server apparatus 4 (Step 2607). And, according to the update request, the actual data or the meta data of the files is updated later (Step 2608). If the migration-in-progress flags 73 are off, which means that the file attributes and actual data have been migrated to the new file server apparatus 4, the process proceeds to Step 2608 to write the update contents received from the NFS processing module 441 or the CIFS processing module 442 into the disk 43 of the new file server apparatus 4. After the data update in Step 2608 is completed, the migration-in-progress flags 73 are turned off (Step 2609), and the process is terminated upon notifying the host 1 or the host 2 that the update process has ended.

Next, a description is made as to the data structure of the log region 434 and the process of reflecting the contents recorded in the log region 434 in the file system (Step 2607 of FIG. 8). When the host 1 or the host 2 makes update requests to update files/directories, etc. during the file migration process, and the files/directories have not been reflected in the new file server apparatus 4, the migration module 444 records contents of the update requests as log data 90 in the log region 434 sequentially from the top of the log region 434 (which corresponds to Step 2611 of FIG. 8).

Figure 9:
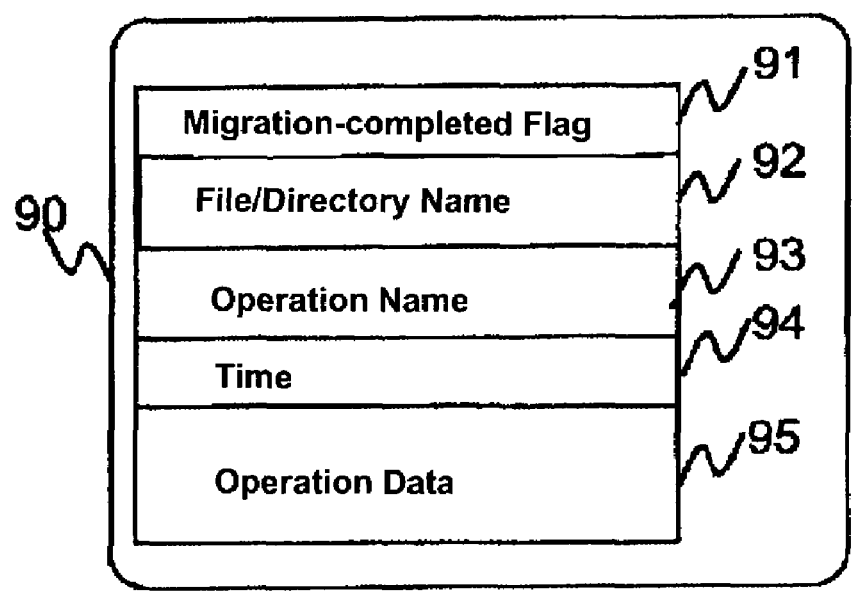
FIG. 9 shows a data structure of log data that is used by a new file server apparatus in accordance with the present invention.

The contents of log data 90 are shown in FIG. 9. Migration-completed flag 91 is a flag that shows that the log data 90 has already been reflected in the file system of the new file server apparatus 4 through the migration module 444. File/directory name 92 indicates a file name or directory name of the targeted file or directory for which the update request has been made by the host 1 or the host 2 during the file migration operation. Operation name 93 indicates the type of process at that particular time. For example, the operation name 93 may indicate writing, moving or deleting the file. Time 94 indicates the time when the request is made. Operation data 95 is the data attached to the process at the particular time, and the operation data 95 differs depending on the type of operation. For example, one of the operation data 95 may be actual file data when a write request has been made.

Figure 10:
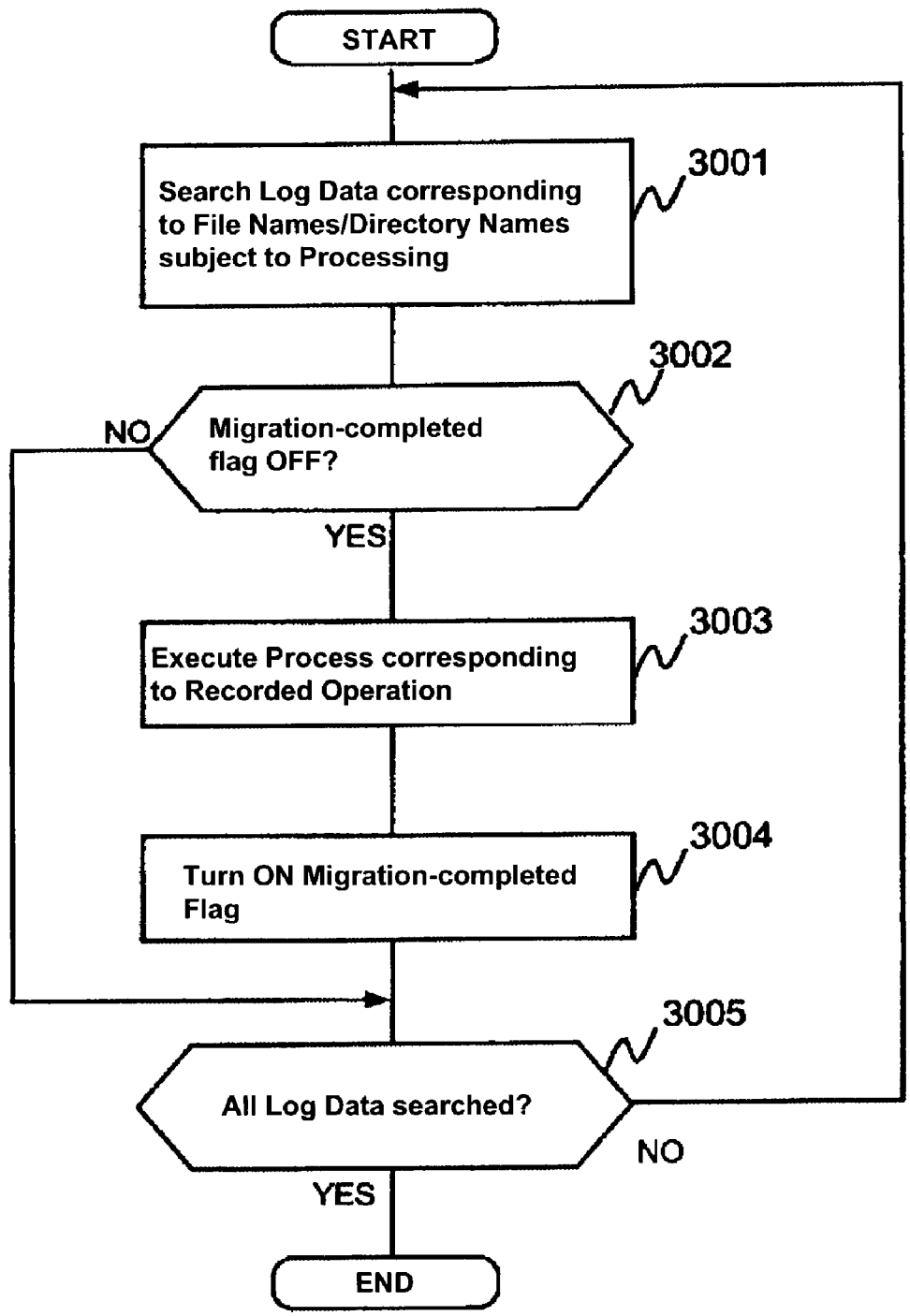
FIG. 10 shows a flowchart of reflection processes for log data which are performed by the migration process.

The flow of reflection process of reflecting the log data 90 is described with reference to FIG. 10. Referring to FIG. 10, a description is first made as to the process that is performed in the case where the update information for files/directories were recorded in the log data 90 when requests to read or write the files/directories were received during the migration process in the processes in Step 2507 in FIG. 7 or Step 2607 in FIG. 8.

First, a search is conducted sequentially from the top of the log region to search log data 90 corresponding to the file/directory names targeted for accesses (Step 3001). In the next Step 3002, a determination is made as to whether the migration-completed flag 91 of the log data 90 is off. If the flag is off, the process proceeds to Step 3003 to execute the process in accordance with the operation recorded in the log data 90. For example, in the case of a data update, data to be written that is recorded on the log data 90 will be written over the corresponding file.

Next, in Step 3004, the migration-completed flag 91 is turned on to move onto to Step 3005. If the migration-completed flag 91 is determined to be on in Step 3002, Steps 3003 and 3004 are skipped to move to Step 3005. In Step 3005, a determination is made as to whether all log data in the log region 434 has been searched. If all log data have not been retrieved, the process returns to Step 3001. The process is completed when all log data have been searched.

Figure 11:
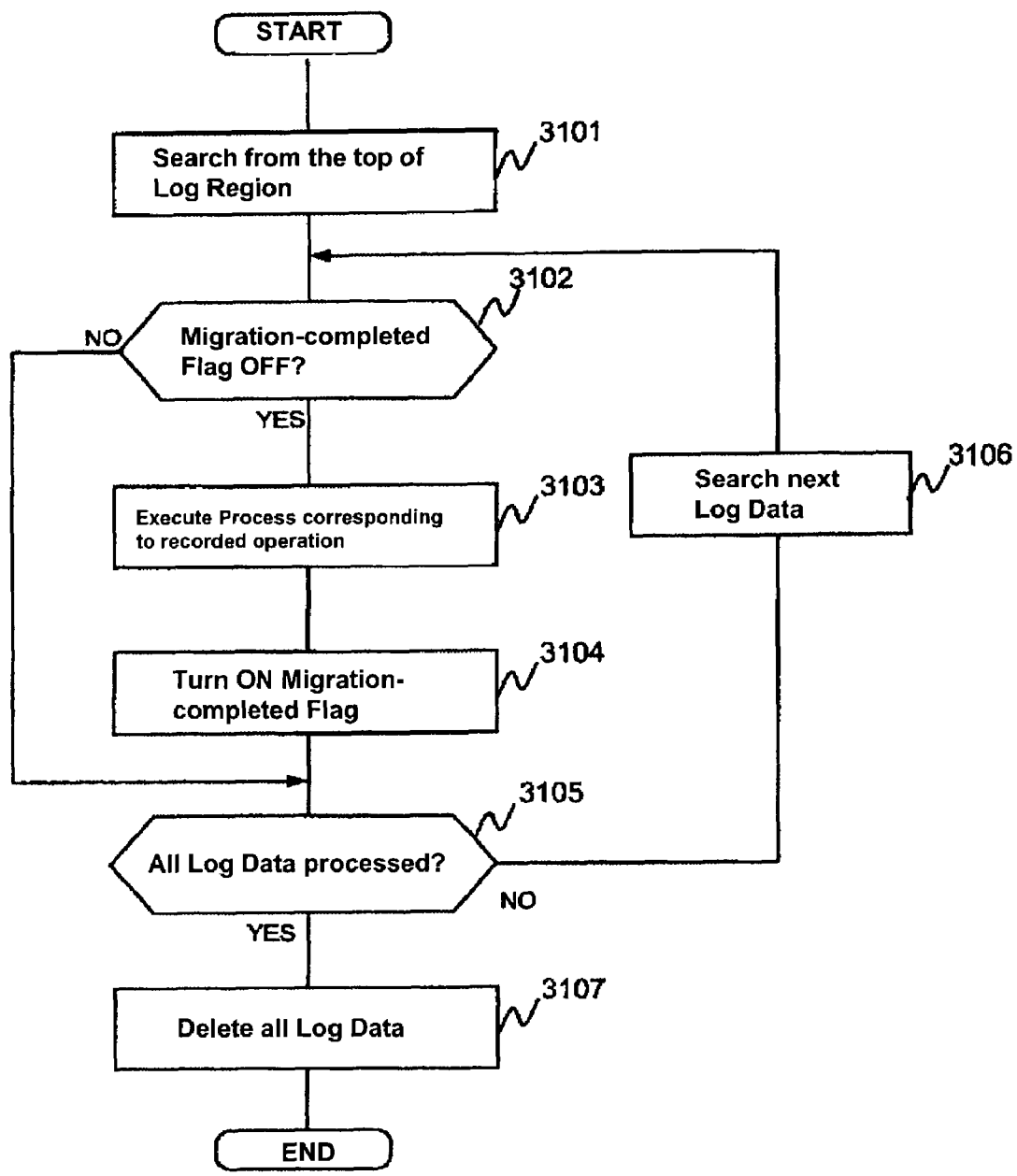
FIG. 11 shows a flowchart of reflection processes for log data which are performed by the migration process.

Referring to FIG. 11, an explanation is made as to the process that takes place in Step 1003 of FIG. 4, which is the reflection process of reflecting the log data 90, which is performed at the end of the migration process. In this process, the contents of all of the log data 90 written in the log region 434 are reflected in the file/directory.

A search is first made from the top of the log region for the log data 90 (Step 3101). Next, a determination is made (Step 3102) as to whether or not the migration-completed flag 91 of the log data 90 is off. If the flag is off, the operation recorded in the log data 90 is executed (Step 3103), and the migration-completed flag 91 is turned on (Step 3104). If the migration-completed flag 91 is already on, these processes are omitted. If all processes are completed for all of the log data 90 (Step 3105), the entire log data 90 in the log region 434 are erased in Step 3107 to terminate the process. If the processes for the entire log data 90 are not completed, the next log data is searched and the processes from Step 3102 are repeated.

In the case of the process shown in FIG. 11, the migration-completed flag 91 may not need to be turned on in Step 3104 because only one process is sequentially performed from the start to the end of the data in the log region 434. However, turning on the flag would be effective when the process is interrupted by some obstruction during the process in FIG. 11. For example, when an obstruction occurs, the reflection process of this log data 90 during the migration process is re-executed after rechecking the log data 90 from the very beginning of the log region 434. If the migration-completed flag 91 is not turned on, the log data 90 with the reflection process completed before the re-execution will also be processed again. This can be avoided by turning on the migration-completed flag 91.

The embodiment above shows an example of how the file system can be migrated from the existing file server apparatus to the new file server apparatus even while receiving accesses from the host computers. But as indicated in the migration processes described with reference to FIGS. 4 through 11, the present embodiment enables data migration in even smaller increments, such as the data migration of specified directories, in addition to the entire file system.

Moreover, the size of the disks (i.e., recording media) at the source and destination of migration need not be the same. Migration is possible if the size of the destination disk is larger than the volume of disk used of the file system at the migration source. Moreover, this embodiment shows the data migration method between two file server apparatuses. However, the present invention can also be used to migrate a file system to an even larger capacity disk within the same file server apparatus if the data volume of the file system in the existing disk has increased, or when a specified directory needs to be moved to a different disk.

The present invention enables a file migration without altering the file attribute information when migrating files between file server apparatuses. Consequently, data can be stored in the new file server apparatus without altering the date information such as the file access time. Also, the file attributes of file server apparatuses supporting multiple file access protocols can be migrated.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A first file server in a computer system including at least a host computer and a second file sever, comprising:

a migration module that reads data and attribute information of at least one file stored in the second file server; and a second module that operates to store the data and the attribute information of the at least one file read out from the second file server in the first file server without changing contents of the attribute information, wherein the migration module obtains the attribute information of a directory of the second file server using NFS command and CIFS command, and verifying whether files exist under the directory, wherein if any files exist, the migration module acquires a NFS attribute information for each of the files under the directory, and acquires a CIFS attribute information for each of the files under the directory, and wherein when the host computer reads the at least one file after the second module stored the at least one file in first file server, the at least one file stored in the first file server is read.

2. The computer system including the first file server according to claim 1, wherein the attribute information of the file includes at least date when the file is created, date when the file is referred, and date when the file is updated.

3. A file migration method for migrating data in a computer system including at least one computer, and a plurality of file servers each having a storage device, the file migration method comprising:
  obtaining by a migration module attribute information of a directory of a first file server using NFS command and CIFS command;
  verifying by the migration module whether files exist under the directory,
  wherein if any files exist,
  obtaining by the migration module a NFS attribute information for files under the directory, and
  obtaining by the migration module a CIFS attribute information for files under the directory is obtained;
  storing the obtained attribute information in a storage device of a second file server; and
  storing in the storage device of the second file server actual data of the file read from the storage device of the first file server according to the attribute information of the file.

4. The file migration method according to claim 3, wherein the attribute information of the file includes at least one of date when the file is created, date when the file is referred, and date when the file is updated, which are stored in the storage device of the first file server.

5. The file migration method according to claim 3, wherein when the computer issues an access request to access a file that is being migrated while at least one of attribute information of the file and actual data of the file is being migrated, a content of the access request is stored in a log region of the second file server, and a process according to the content stored in the log region is performed after the file has been migrated.

6. The file migration method according to claim 3, wherein the second file server accommodates at least one file access protocol, and
  attribute information of the file is stored according to each of the at least one file access protocol.

7. The file migration method according to claim 6, wherein the second file server accommodates a plurality of file access protocols, and attribute information of the file is stored according to each of the plurality of file access protocols.

8. The file migration method according to claim 3, wherein the first file server is an existing file server and the second file server is a new file server, and files stored in the existing file server are migrated to the new file server.

9. A file migration method for migrating data in a computer system including at least one host computer, an existing first file server and a new second file server, each of the first file server and the second file server having a storage device, the file migration method comprising:
  obtaining by a migration module attribute information of a directory of a first file server using NFS command and CIFS command;
  verifying by the migration module whether files exist under the directory,
  wherein if any files exist,
  obtaining by the migration module a NFS attribute information for files under the directory, and
  obtaining by the migration module a CIFS attribute information for files under the directory is obtained;
  obtaining actual data of files from the storage device of the first file server and storing in the storage device of the second file server the actual data of the files read from the storage device of the first file server according to the attribute information stored in the storage device of the second file server.

10. The file migration method according to claim 9, further comprising, after the steps of the step of reading the attribute information of the directory, the step of reading attribute information of the files from the storage device of the first file server according to the first file access protocol and the second file access protocol.

11. The file migration method according to claim 10, wherein the steps of storing the actual data of the files from the storage device of the first server according to the first file access protocol and the second file access protocol are conducted after the steps of reading the attribute information of the files according to the first file access protocol are completed.

12. The file migration method according to claim 10, wherein the actual data of the files are stored in the storage device of the second file server after all the attribute information are stored in the storage device of the second file server.

13. The file migration method according to claim 10, wherein the attribute information of the files includes at least one of date when the files are created, date when the files are referred, and date when the files are updated, which are stored in the storage device of the first file server.

14. The file migration method according to claim 10, wherein when the host computer issues an access request to access a file that is being migrated while at least one of attribute information of the file and actual data of the file is being migrated, a content of the access request is stored in a log region of the storage device of the second file server, and a process according to the content stored in the log region is performed after the file has been migrated from the first file server to the second file server.

15. The migration method according to claim 9, further comprising the step of reading attribute information of subdirectories under the directory according to the first file access protocol and storing the read attribute information of the subdirectories in the storage device of the second file server.

16. The migration method according to claim 9, further comprising the step of reading attribute information of subdirectories under the directory according to the second file access protocol and storing the read attribute information of the subdirectories in the storage device of the second file server.

17. A file migration method for migrating date in a computer system including at least one host computer and at least one existing file server, the file migration method comprising the steps of:
  disconnecting the existing file server from the computer system;
  adding a new file server and connecting the existing file server to the new file server;
  obtaining by a migration module attribute information of a directory of the existing server using NFS command and CIFS command;
  verifying by the migration module whether files exist under a directory,
  wherein if any files exist,
  obtaining by the migration module a NFS attribute information for files under the directory, and
  obtaining by the migration module a CIFS attribute information for files under the directory is obtained;
  reading out a directory tree structure of the existing file server and storing the directory tree structure in the new file server;

reading out all data files in the existing file server and successively writing the data files into the new file server according to the directory tree structure.

18. The file migration method according to claim 17, wherein the step of reading out the directory tree structure includes the steps of reading out attribute information for files from the existing file server and writing the attribute information into the new file server without changing the attribute information.

19. The file migration method according to claim 18, wherein the attribute information of the files includes at least one of date when the files are created, date when the files are referred, and date when the files are updated, which are stored in the storage device of the existing file server.

20. The file migration method according to claim 19, wherein when the host computer issues an access request to access a file that is being migrated while at least one of attribute information of the file and actual data of the file is being migrated, a content of the access request is stored in a log region of the new file server, and a process according to the content stored in the log region is performed after the file has been migrated.

21. The file migration method according to claim 17, further comprising, after the step of reading out the attribute information, the step of reading the files from the existing file server and storing the files in the new file server according to the attribute information.

22. The file migration method according to claim 21, wherein the new file server accommodates a plurality of file access protocols, and the attribute information of the files is stored according to each of the plurality of file access protocols.

23. A first file server in a computer system including at least a host computer and a second file sever, comprising:
   a migration module that reads data and attribute information of at least one file stored in the second file server; and
   a second module that operates to store the data and the attribute information of the at least one file read out from the second file server in the first file server without changing contents of the attribute information,
   wherein the migration module obtains the attribute information of a directory of the second file server using NFS command and CIFS command, and verifying whether files exist under the directory,
   wherein if any files exist, the migration module acquires a NFS attribute information for each of the files under the directory, and acquires a CIFS attribute information for each of the files under the directory;
   wherein when the host computer issues a read request to read a first file or file attribute information of the first file during migration process, the migration module determines whether the attribute information of the first file has been migrated to the first file server,
   wherein, if the attribute information has not been migrated, the migration module reads the attribute information and data of the first file from the second file server,
   if the attribute information has been migrated, the migration module further determines whether data of the first file has been migrated,
   wherein in the case data of the first file has not been migrated, the migration module reads the data of the first file from the second file server, and writes the data of the first file into the first file server,
   the migration module then reads attribute information and data of the first file from the first file server;
   wherein in the case data of the first file has been migrated, the migration module then reads attribute information and data of the first file from the first file server.

24. A first file server in a computer system including at least a host computer and a second file sever, comprising:
   a migration module that reads data and attribute information of at least one file stored in the second file server; and
   a second module that operates to store the data and the attribute information of the at least one file read out from the second file server in the first file server without changing contents of the attribute information,
   wherein the migration module obtains the attribute information of a directory of the second file server using NFS command and CIFS command, and verifying whether files exist under the directory,
   wherein if any files exist, the migration module acquires a NFS attribute information for each of the files under the directory, and acquires a CIFS attribute information for each of the files under the directory;
   wherein when the host computer issues a request to delete or update a first file during migration process, the migration module determines whether attribute information of the first file has been migrated to the first file server;
   wherein, if the attribute information has not been migrated, the migration module reads the file attribute information and data of the first file from the second file server, and writes and updates the attribute information and data of the first file in a log region,
   if the attribute information of the file has been migrated, the migration module further determines whether the data of the first file has been migrated,
   wherein in the case the data of the first file has not been migrated, the migration module reads data of the first file from the second file server, and writes and updates the data of the first file to the first file server.

25. A file migration method for migrating data in a computer system including at least one computer, and a plurality of file servers each having a storage device, the file migration method comprising:
   obtaining by a migration module attribute information of a directory of a first file server using NFS command and CIFS command:
   verifying by the migration module whether files exist under the directory,
   wherein if any files exist,
   obtaining by the migration module a NFS attribute information for files under the directory, and
   obtaining by the migration module a CIFS attribute information for files under the directory is obtained;
   storing the obtained attribute information in a storage device of a second file server; and
   storing in the storage device of the second file server actual data of the file read from the storage device of the first file server according to the attribute information of the file;
   wherein when the computer issues a read request to read a first file or file attribute information of the first file during migration process, further comprising:
   determining by the migration module whether the attribute information of the first file has been migrated to the second file server,
   wherein if the attribute information has not been migrated:
   reading by the migration module the attribute information and data of the first file from the first file server;
   wherein if the attribute information has been migrated:

determining by the migration module whether data of the first file has been migrated;

wherein in the case data of the first file has not been migrated:

reading by the migration module the data of the first file from the first file server, and writing the data of the first file into the second file server, and reading attribute information and data of the first file from the second file server;

wherein in the case data of the first file has been migrated:

reading by the migration module attribute information and data of the first file from the second file server.

26. A file migration method for migrating data in a computer system including at least one computer, and a plurality of file servers each having a storage device, the file migration method comprising:

obtaining by a migration module attribute information of a directory of a first file server using NFS command and CIFS command:

verifying by the migration module whether files exist under the directory, wherein if any files exist, obtaining by the migration module a NFS attribute information for files under the directory, and obtaining by the migration module a CIFS attribute information for files under the directory is obtained;

storing the obtained attribute information in a storage device of a second file server; and storing in the storage device of the second file server actual data of the file read from the storage device of the first file server according to the attribute information of the file;

wherein when the computer issues a request to delete or update a first file during migration process, further comprising:

determining by the migration module whether attribute information of the first file has been migrated to the second file server;

wherein, if the attribute information has not been migrated:

reading by the migration module the file attribute information and data of the first file from the first file server, and writing and updating the attribute information and data of the first file in a log region, wherein if the attribute information of the file has been migrated:

determining by the migration module whether the data of the first file has been migrated, wherein in the case the data of the first file has not been migrated:

reading by the migration module data of the first file from the first file server, and writing and updating the data of the first file to the second file server.

27. A file migration method for migrating data in a computer system including at least one host computer, an existing first file server and a new second file server, each of the first file server and the second file server having a storage device, the file migration method comprising:

obtaining by a migration module attribute information of a directory of a first file server using NFS command and CIFS command;

verifying by the migration module whether files exist under the directory, wherein if any files exist, obtaining by the migration module a NFS attribute information for files under the directory, and obtaining by the migration module a CIFS attribute information for files under the directory is obtained;

obtaining actual data of files from the storage device of the first file server and storing in the storage device of the second file server the actual data of the files read from the storage device of the first file server according to the attribute information stored in the storage device of the second file server;

wherein when the host computer issues a read request to read a first file or file attribute information of the first file during migration process, further comprising:

determining by the migration module whether the attribute information of the first file has been migrated to the second file server, wherein if the attribute information has not been migrated:

reading by the migration module the attribute information and data of the first file from the first file server;

wherein if the attribute information has been migrated:

determining by the migration module whether data of the first file has been migrated;

wherein in the case data of the first file has not been migrated:

reading by the migration module the data of the first file from the first file server, and writing the data of the first file into the second file server, and reading attribute information and data of the first file from the second file server;

wherein in the case data of the first file has been migrated:

reading by the migration module attribute information and data of the first file from the second file server.

28. A file migration method for migrating data in a computer system including at least one host computer, an existing first file server and a new second file server, each of the first file server and the second file server having a storage device, the file migration method comprising:

obtaining by a migration module attribute information of a directory of a first file server using NFS command and CIFS command;

verifying by the migration module whether files exist under the directory, wherein if any files exist, obtaining by the migration module a NFS attribute information for files under the directory, and obtaining by the migration module a CIFS attribute information for files under the directory is obtained;

obtaining actual data of files from the storage device of the first file server and storing in the storage device of the second file server the actual data of the files read from the storage device of the first file server according to the attribute information stored in the storage device of the second file server;

wherein when the host computer issues a request to delete or update a first file during migration process, further comprising:

determining by the migration module whether attribute information of the first file has been migrated to the second file server;

wherein, if the attribute information has not been migrated:

reading by the migration module the file attribute information and data of the first file from the first file server, and writing and updating the attribute information and data of the first file in a log region, wherein if the attribute information of the file has been migrated:

determining by the migration module whether the data of the first file has been migrated, wherein in the case the data of the first file has not been migrated:
reading by the migration module data of the first file from the first file server, and
writing and updating the data of the first file to the second file server.

29. A file migration method for migrating date in a computer system including at least one host computer and at least one existing file server, the file migration method comprising the steps of:
disconnecting the existing file server from the computer system;
adding a new file server and connecting the existing file server to the new file server;
obtaining by a migration module attribute information of a directory of the existing server using NFS command and CIFS command;
verifying by the migration module whether files exist under a directory,
wherein if any files exist,
obtaining by the migration module a NFS attribute information for files under the directory, and
obtaining by the migration module a CIFS attribute information for files under the directory is obtained;
reading out a directory tree structure of the existing file server and storing the directory tree structure in the new file server;
reading out all data files in the existing file server and successively writing the data files into the new file server according to the directory tree structure;
wherein when the host computer issues a read request to read a first file or file attribute information of the first file during migration process, further comprising:
determining by the migration module whether the attribute information of the first file has been migrated to the new file server,
wherein if the attribute information has not been migrated:
reading by the migration module the attribute information and data of the first file from the existing file server;
wherein if the attribute information has been migrated:
determining by the migration module whether data of the first file has been migrated;
wherein in the case data of the first file has not been migrated:
reading by the migration module the data of the first file from the first file server, and
writing the data of the first file into the second file server, and
reading attribute information and data of the first file from the new file server;
wherein in the case data of the first file has been migrated:
reading by the migration module attribute information and data of the first file from the new file server.

30. A file migration method for migrating date in a computer system including at least one host computer and at least one existing file server, the file migration method comprising the steps of:
disconnecting the existing file server from the computer system;
adding a new file server and connecting the existing file server to the new file server;
obtaining by a migration module attribute information of a directory of the existing server using NFS command and CIFS command;
verifying by the migration module whether files exist under a directory,
wherein if any files exist,
obtaining by the migration module a NFS attribute information for files under the directory, and
obtaining by the migration module a CIFS attribute information for files under the directory is obtained;
reading out a directory tree structure of the existing file server and storing the directory tree structure in the new file server;
reading out all data files in the existing file server and successively writing the data files into the new file server according to the directory tree structure;
wherein when the host computer issues a request to delete or update a first file during migration process, further comprising:
determining by the migration module whether attribute information of the first file has been migrated to the new server;
wherein, if the attribute information has not been migrated:
reading by the migration module the file attribute information and data of the first file from the existing file server, and
writing and updating the attribute information and data of the first file in a log region,
wherein if the attribute information of the file has been migrated:
determining by the migration module whether the data of the first file has been migrated,
wherein in the case the data of the first file has not been migrated:
reading by the migration module data of the first file from the existing file server, and
writing and updating the data of the first file to the new file server.

* * * * *